March 16, 1943. C. WANNER 2,314,296
APPARATUS FOR TREATING CEMENT RAW MATERIAL AND THE LIKE
Filed April 25, 1941
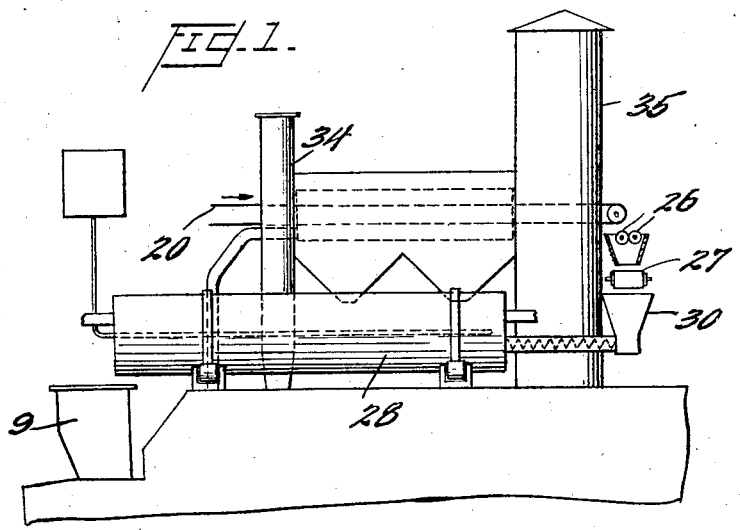
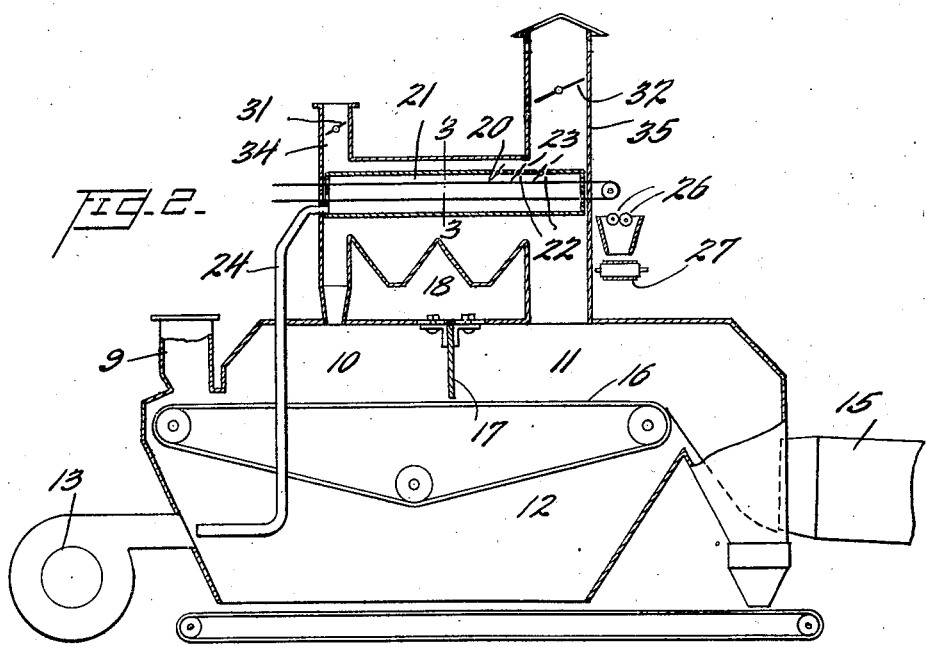
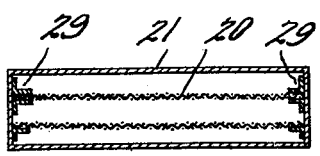
Inventor
Carlo Wanner
By Watson, Cole, Grindle & Watson
Attorney Patented Mar. 16, 1943

2,314,296

UNITED STATES PATENT OFFICE 2,314,296

APPARATUS FOR TREATING CEMENT RAW MATERIAL AND THE LIKE

Carlo Wanner, Barcelona, Spain

Application April 25, 1941, Serial No. 390,420

4 Claims. (Cl. 263—32)

This invention relates to apparatus for the treatment of cement and similar materials and to processes for effecting such treatment, and is directed particularly to improvements in apparatus and processes for the burning of Portland cement and other hydraulic cements and limestones.

The prior U. S. Patents to Otto Lellep, Nos. 1,775,313, 1,992,704, and 1,994,718, disclose a process and apparatus for the treatment of cement raw material which is highly efficient. The basic feature of the Lellep process, which involves the treatment of cement and similar materials prior to the sintering thereof in a rotary kiln, is the use of the waste kiln gases to effect preliminary or partial calcining of the material. Thus in the preferred form of the Lellep apparatus, cement material is delivered to a traveling grate or gas pervious conveyor and is moved in succession through two zones. In the first of these zones the material, in the form of slightly moist nodules or agglomerates of fairly uniform size, is dried at a moderately high temperature, and thereafter passes into the second or precalcining zone, in which the temperature is substantially higher. The waste kiln gases act directly on the material in each of these zones, being drawn downwardly through the bed of material and through the supporting grate, and the difference in temperature in the two zones is obtained by providing for the direct passage of the exhaust gas from the kiln into the precalcining zone and for indirect passage of the gas from the precalcining to the predrying zone. Thus it is possible to prevent explosion and disruption of the agglomerates or nodules by drying the latter relatively slowly before they are subjected to the action of the highly heated gases issuing directly from the kiln.

In the Lellep patents it is contemplated that the cement raw material subjected to the process shall be supplied in pulverulent and generally dry form, and agglomerated by spraying with water in a suitable agglomerating drum, such as is described in the patents. The effectiveness of the process can be very largely attributed to the fact that the material is presented to the action of the kiln exhaust gases in the form of nodules of reasonably uniform size through which the gases may readily be passed. Reduction of size or breaking up of the nodules would impede the progress of gas through the bed of material on the moving grate, and material in large lumps cannot be burned with that degree of uniformity which is required for best results.

The Lellep process does not contemplate the direct treatment of material in the form of a sludge or slurry, and it has heretofore been believed impossible to achieve satisfactory results with such material. It has been proposed, for example, to dehydrate the slurry on special filters, but a slurry so treated ordinarily contains at least 18% water after drying, and is in the form of a filter cake which is difficult to treat either in the conventional kiln or by means of the Lellep process. Thus cement raw material with 18% water content is entirely unsuited for the calcining process of the Lellep patents, since the waste gases of the kiln cannot be passed through the more or less dense layer of material on the moving conveyor, and notwithstanding the substantial heat economy of the process, the application thereof has been limited to the treatment of preformed crude meal.

In accordance with the instant invention it is proposed to provide a method and apparatus for the treatment of slurry, sludge, and other semiliquid or pasty material so as to obtain the advantages inherent in the Lellep process as previously employed. More specifically, it is an object of the invention to provide a process and apparatus in which cement slurry and the like may be dried by the action of exhaust kiln gas and further prepared and treated to the extent necessary to render it usable in the Lellep process. In the preferred form of the invention, the apparatus of the present invention is associated with apparatus of the general character disclosed in the aforesaid Lellep patents, the slurry being dried by a portion of the waste gases flowing into the predrying and precalcining chambers of the Lellep apparatus.

It is a further object of the invention to provide, in combination with apparatus for the predrying and precalcining of cement raw material and the like in the manner described in the aforesaid Lellep patents, a drying chamber in which may be introduced crude sludge from a filter press, means for directing exhaust kiln gas about and within the drying chamber to dry the sludge, and apparatus for pulverizing and subsequently agglomerating the material thus dried for subjection to the predrying and precalcining steps of the Lellep process.

A further object of the invention is the provision of a drying chamber for sludge or slurry in which such material is moved through a drying chamber on a gas permeable conveyor, and in which means are provided for causing the waste kiln gas to flow downwardly through the material and the conveyor. Preferably the gas thus passed through the material is subsequently discharged beneath the moving grate or conveyor of the Lellep apparatus.

Further objects and features of the invention will be apparent from the following description, taken in connection with the accompanying drawing, in which Figure 1 is a side elevation of apparatus embodying the principles of the invention;

Figure 2 is a longitudinal vertical sectional view of the apparatus shown in Figure 1; and Figure 3 is a partial transverse section taken substantially on the line 3—3 of Figure 2.

In order to facilitate an understanding of the invention, reference will be made to the several embodiments thereof illustrated in the accompanying drawing and specific language will be employed. It will nevertheless be understood that various further modifications of the devices illustrated herein, such as would fall within the province of those skilled in the art to construct are contemplated as part of the present invention.

The invention is illustrated as applied to the preparation of cement raw material or the like, initially in the form of slurry or sludge, for introduction in apparatus for effecting a partial calcining operation prior to the introduction of the material into a kiln for final burning. This apparatus consists essentially of means forming a chamber 12 in which is disposed an air pervious support for the material to be treated. Preferably the support comprises a grate or conveyor 16 arranged to receive the material in the form of a thin layer from the hopper 9, to carry the same in succession through two auxiliary chambers or zones 10 and 11, separated by a partition 17, and to discharge the material from the far end of the chamber 12 into a conventional rotary kiln 15. The hot exhaust gases issuing from the kiln flow over the conveyor 16 and downwardly through the material thereon and through the conveyor, being discharged from the chamber 12 by a blower 13. The partition 17, and the baffle 18 associated therewith, serve to direct the hot gases through a circuitous path from the zone 11 to the zone 10, so that the temperature of the gases entering the zone 10 is decidedly lower than the exhaust temperature at the kiln mouth and the temperature within the zone 11.

Thus, as described with more particularity in the Lellep patents hereinbefore referred to, it is contemplated that the apparatus be supplied through the hopper 9 with material in the form of relatively small lumps or nodules of generally uniform size, and these nodules are commonly formed, also as described in the patents, by the addition of moisture to relatively dry material and concurrent agitation in a nodulizing or agglomerating drum. The lower temperature prevailing in zone 10 is sufficiently high to completely dry these nodules, but is not so high that the nodules are exploded or disrupted. Consequently the conveyor 16 carries forward through the zone 11 a layer of separate and intact nodules affording adequate interstices for the passage of gas downwardly through the layer, and adequate and uniform heating at a temperature sufficient to insure partial calcination of the material in the zone 11 is assured.

It will be understood that the details of the structure thus far described constitute per se no part of the present invention, which consists primarily in the use, in combination with apparatus such as shown in the prior patents to Lellep, of means for preparing material which is in the form of a slurry or sludge for introduction into the hopper 9 in the desired form of small lumps or nodules.

Thus the slurry or sludge is preferably initially drained or treated in a filter press to remove excess liquid, is introduced on a gas pervious support consisting of a conveyor 20, and is carried by the conveyor through a drying chamber 21 located in the upper portion of the chamber 12 above the partition 17 and baffle 18. The chamber 21 may be provided with a plurality of openings 22 with which is associated suitable valve or adjustable closure means 23 communicating with the interior of the chamber 12, whereby a controlled quantity of the heated gases flowing in the latter may be admitted to the drying chamber 21, in which they will flow over and downwardly through the layer of moist material on the conveyor 20. Suitable means is provided to force the gases downwardly through this layer, but in the preferred form of the invention the desired result is achieved by the provision of a gas exhaust conduit 24, communicating with the chamber 21 below the conveyor 20, and discharging within the chamber 12 below the conveyor 16, preferably adjacent the blower 13, so that the reduced pressure established by the blower may be utilized for the purpose.

The dried material from the chamber 21 may be discharged between the rolls 26 for breaking up or pulverizing the dried cake, and may then be delivered by a suitable conveyor 27 to a hopper 30 and thence fed to an agglomerating drum indicated generally at 28 in which it is converted into lumps, pellets, or nodules, as hereinbefore described. This drum may be constructed as disclosed more particularly in the patent to Lellep 1,994,718 so as to discharge moisture on the material in the form of small drops, and while the material is being agitated. Details of the agglomerating drum form per se no part of the instant invention and this drum may be modified as desired. From the drum the nodules are fed into the hopper 9 and thereby distributed on the conveyor 16 for the partial calcining operation hereinbefore described.

It will be noted from Figure 3 of the drawing that the conveyor 20, which may consist of an endless mesh band, extends completely across the drying chamber 21 and is sealed in any suitable manner as indicated at 29 to avoid leakage of gas around the conveyor and to ensure passage thereof through the layer of moist material. It will be appreciated, however, that a certain amount of heat for drying is made available through the walls defining the chamber 21, since the hot gases traverse the length of the chamber in passing from zone 11 to zone 10 of the principal chamber 12. Regulation of gas pressure and temperature may be effected by means of the vent valves 31 and 32 in the stacks 34 and 35 respectively as well as by adjustment lengthwise in the chamber 12 of the partition 17.

Having thus described the invention, what is claimed as new and desired to be secured by Letters Patent is:

1. In apparatus for preparing cement raw material and the like in the form of slurry or sludge for introduction into a kiln, the combination with means for filtering the material to remove excess liquid therefrom, of a gas permeable conveyor for receiving the filtered material in a relatively thin layer, means for forcing hot waste kiln gases downwardly through the material and the conveyor to dry the material, means for crushing the dried material, means for supplying moisture to the crushed material and simultaneously agitating the same to form the material into lumps or nodules of relatively small size, and means for delivering the nodules to a second gas permeable conveyor for a partial calcining operation prior to introduction thereof into the kiln.

2. In apparatus for preparing cement raw material and the like in the form of slurry or sludge for introduction into a kiln, the combination with a gas permeable conveyor for receiving the material in a relatively thin layer, means for forcing hot waste kiln gases downwardly through the material and the conveyor to dry the material, means for forming the material into lumps or nodules of relatively small size, and means for delivering the nodules to a second gas permeable conveyor for a partial calcining operation prior to introduction thereof into the kiln.

3. In apparatus for preparing cement raw material and the like in the form of slurry or sludge for introduction into a kiln, the combination with a drying chamber, of a gas permeable support arranged within said chamber to receive a layer of the material, means for causing hot waste kiln gases to flow within said chamber and downwardly through the material therein to dry the same, and means for forming the dried material into lumps or nodules of relatively small size, a second gas permeable support for receiving the lumps or nodules of material, and means causing hot waste kiln gases to flow down through the material on said second support to partially calcine the material before delivery thereof to the kiln.

4. In apparatus for preparing cement raw material and the like in the form of slurry or sludge for introduction into a kiln, the combination with a drying chamber, of a gas permeable support arranged within said chamber to receive a layer of the material, means for causing hot waste kiln gases to flow within said chamber and downwardly through the material therein to dry the same, means for forming the dried material into lumps or nodules of relatively small size, a second gas permeable support for receiving the lumps or nodules of material, means causing hot waste kiln gases to flow down through the material on said second support to partially calcine the material before delivery thereof to the kiln, and means for discharging the gases from said chamber beneath said second support.

CARLO WANNER.